Patented June 10, 1924.

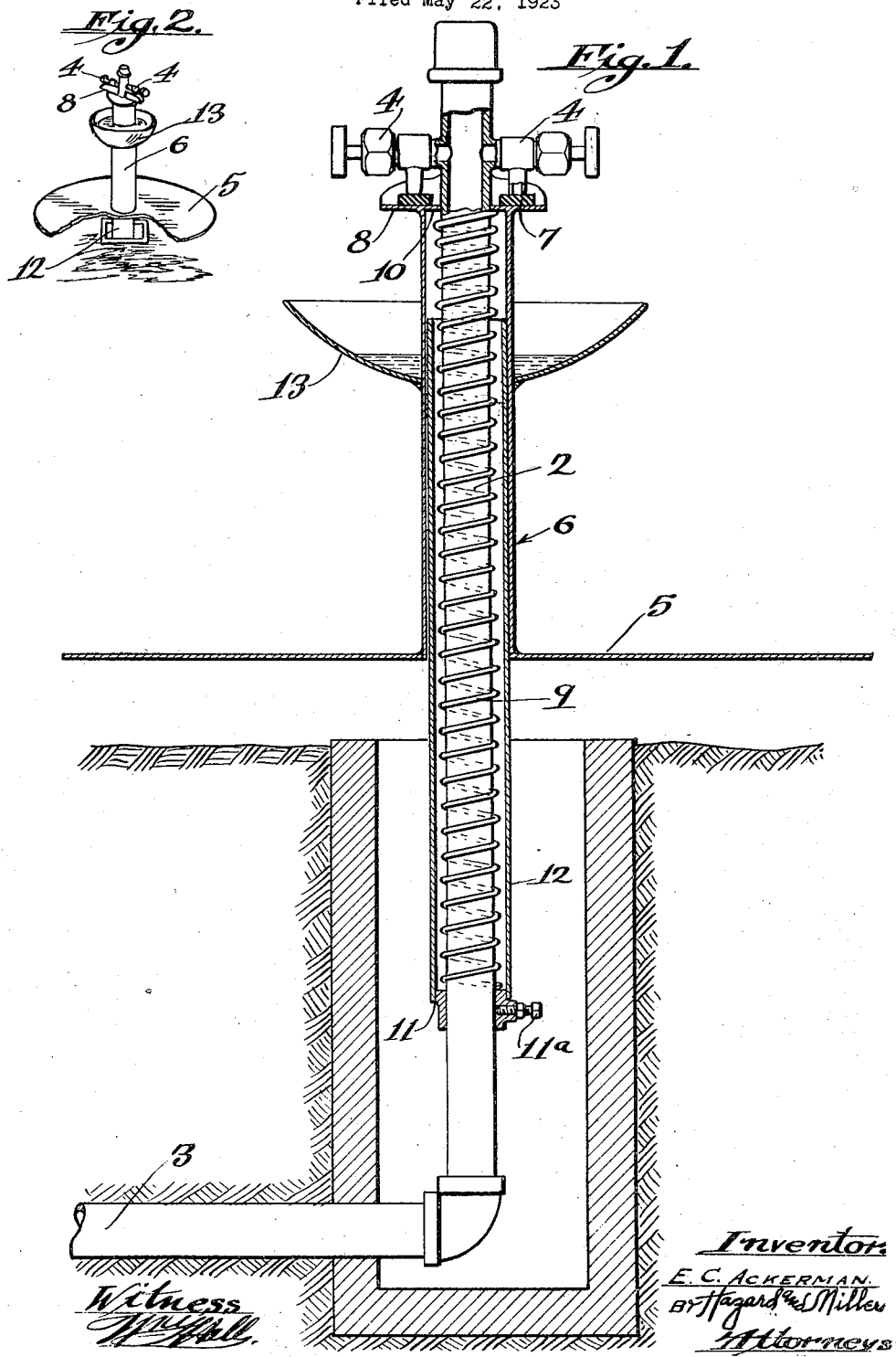

1,497,256

UNITED STATES PATENT OFFICE.

EDWARD C. ACKERMAN, OF LOS ANGELES, CALIFORNIA.

AUTOMATIC POULTRY FOUNTAIN.

Application filed May 22, 1923. Serial No. 640,680.

*To all whom it may concern:*

Be it known that I, EDWARD C. ACKERMAN, a citizen of the United States, residing at Los Angeles, in the county of Los Angeles and State of California, have invented new and useful Improvements in Automatic Poultry Fountains, of which the following is a specification.

This invention relates to means for supplying fresh water to livestock, and more particularly to poultry and fowl.

It is an object of the present invention to provide a fountain adapted to be automatically set flowing by operation of means adapted to be actuated by the weight of the animal, poultry or fowl seeking water. Another object is to provide a drinking service fountain combining adjustable control valves and means for normally preventing the discharge of liquid from the valves, and which means is adapted to be actuated to permit the flow of water when required by the animal or fowl. An object is to provide a sanitary fountain for intermittently supplying fresh water on requirement.

A further object is to provide a stock or fowl serving fountain of extremely simple and inexpensive construction, and one that may be readily installed, mounted and operated.

Other objects and advantages will be made manifest in the following specification of an embodiment of the invention illustrated in the accompanying drawings, wherein Figure 1 is a vertical, central section of the improved fountain, parts being in elevation.

Fig. 2 is a perspective, on a smaller scale, of the fountain, the platform being broken away.

The present fountain consists of a stand pipe 2, which is adapted to be connected to any source of supply, as to a supply pipe 3. The head of the stand pipe is shown as provided with any suitable number of valves 4, which are designed to be adjusted so as to permit the flow of a rather small quantity of water.

Means are provided for normally preventing the flow of water from the partially opened valves 4 of the stand pipe, and such means includes a platform 5, onto which the stock or poultry to be served will climb and their weight will serve to depress the platform and uncover outlets of the valves. The platform is shown in the form of a disc having an upwardly extending sleeve 6 surrounding the stand pipe 2, and having at its upper end stopper or closure means to be thrust normally against the outlets of the valves to shut off the flowing water.

Such stopper means may consist of plugs or blocks of compressible material, such as rubber or leather. The stopper blocks 7 are shown as removably, and therefore renewably, mounted in holders 8, provided on the upper end of the sleeve 6. The platform and the stoppers are normally pressed upwardly so as to close the outlets of the valves by suitable means such as a spring 9 which, in the present case, is coiled on the stand pipe 2; its upper end engaging a collar or shoulder 10, forming a part of or attached to the upper portion of the sleeve 6. The lower end of the spring engages a shoulder 11, which may form a part of a tube or barrel 12, extending upwardly and around the stand pipe 2, and upon which the sleeve 6 of the platform 5 is guided and mounted.

Thus it will be seen that the spring 9 provides for the normal closure of the valve outlets by the stoppers 7, and an animal or fowl desiring drinking water climbs or jumps upon the platform and the weight of the animal on the platform will cause the stopper or stoppers to be sufficiently withdrawn from against the valve outlets as to permit the discharge of water therefrom.

The discharged water will run from the stopper holders 8, which form spout-like mouths, into a basin 13, which is provided, in the present case, upon the sleeve 6.

The degree of pressure of the spring may be readily regulated by releasing a set screw 11$^a$ in the collar 11 and shifting the collar up or down as may be required.

Further embodiments, modifications and variations may be resorted to within the principle of the invention.

What is claimed is:

1. An automatic fountain comprising a stand pipe, a spring mounted upon the stand pipe, means upon the stand pipe for holding the lower end of the spring, a valve at the upper end of the stand pipe and having a downwardly discharging nozzle, a sleeve at the upper end of the stand pipe resting against the spring, a platform connected to the sleeve, a basin mounted above the platform, and a stopper block upon the sleeve to engage the nozzle.

2. An automatic fountain comprising a stand pipe, having a downwardly discharging nozzle at its upper end, a shoulder adjustably mounted upon the stand pipe, a spring upon the stand pipe resting against the shoulder, a tube upon the stand pipe around the spring and supported by the shoulder, a shoulder slidingly mounted upon the stand pipe resting against the upper end of the spring, a sleeve fixed to the shoulder and extending downwardly around the tube to slide upon the tube, a stopper block upon the shoulder to engage the nozzle, a platform connected to the lower end of the sleeve, and a basin connected to the upper part of the sleeve.

In testimony whereof I have signed my name to this specification.

EDWARD C. ACKERMAN.